United States Patent
Kusunoki et al.

(10) Patent No.: US 12,479,714 B2
(45) Date of Patent: Nov. 25, 2025

(54) DENTAL PASTE FILLING DEVICE AND METHOD

(71) Applicant: KABUSHIKI KAISHA SHOFU, Kyoto (JP)

(72) Inventors: Akihiro Kusunoki, Kyoto (JP); Motohiro Tanaka, Kyoto (JP); Hiroyuki Kobayashi, Kyoto (JP)

(73) Assignee: KABUSHIKI KAISHA SHOFU, Kyoto (JP)

( * ) Notice: Subject to any disclaimer, the term of this patent is extended or adjusted under 35 U.S.C. 154(b) by 46 days.

(21) Appl. No.: 18/576,243

(22) PCT Filed: May 26, 2022

(86) PCT No.: PCT/JP2022/021527
§ 371 (c)(1),
(2) Date: Jan. 3, 2024

(87) PCT Pub. No.: WO2023/281931
PCT Pub. Date: Jan. 12, 2023

(65) Prior Publication Data
US 2025/0026628 A1    Jan. 23, 2025

(30) Foreign Application Priority Data
Jul. 8, 2021    (JP) .................................. 2021-113542

(51) Int. Cl.
B67D 7/76    (2010.01)
B67D 7/02    (2010.01)
B67D 7/78    (2010.01)

(52) U.S. Cl.
CPC .............. B67D 7/763 (2013.01); B67D 7/02 (2013.01); B67D 7/78 (2013.01); *B67D 2210/0016* (2013.01)

(58) Field of Classification Search
CPC . B67D 7/763; B67D 7/02; B67D 7/78; B67D 2210/0016; B65B 43/46; B65B 43/59; B65B 3/12; B65B 3/22
(Continued)

(56) References Cited

U.S. PATENT DOCUMENTS 5,217,050 A    6/1993  Varlet
5,431,201 A *  7/1995  Torchia ................... B65B 3/003
                                                                  901/6

(Continued)

FOREIGN PATENT DOCUMENTS

DE    1 432 143      3/1969
JP    2-258502      10/1990
(Continued)

OTHER PUBLICATIONS

International Search Report issued Jul. 12, 2022 in International Application No. PCT/JP2022/021527.
(Continued)

*Primary Examiner* — Jason K Niesz
(74) *Attorney, Agent, or Firm* — Wenderoth, Lind & Ponack, L.L.P.

(57) ABSTRACT

A dental paste filling device for filling dental paste in a container without entraining air bubbles is disclosed. The dental paste filling device includes: a paste supply stage serving as a supply source of the dental paste; a paste filling stage where the dental paste is filled in the container; and a supply flow passage connecting the both stages. The paste supply stage comprises: a storage chamber for storing the dental paste; a storage chamber depressurizing and defoaming device for depressurizing the inside of the storage chamber to defoam the dental paste within the storage chamber; and a storage chamber extruding device for extruding the dental paste within the storage chamber towards the supply flow passage. The paste filling stage comprises: a filling chamber having an open/close mechanism; a holder for detachably holding the container inside the filling chamber; a filling chamber deaerating device for depressurizing the inside of the filling chamber to prevent entrainment of air bubbles into the dental paste; and a reception port for introducing the dental paste into the filling chamber. The supply flow passage comprises: an upstream tube connected to the storage chamber; a downstream tube connected to the reception port of the filling chamber, and a discharge control valve disposed between the upstream tube and the downstream tube.

7 Claims, 15 Drawing Sheets

(58) Field of Classification Search
USPC .................................................. 141/18–27
See application file for complete search history.

(56) References Cited

U.S. PATENT DOCUMENTS

| | | | |
|---|---|---|---|
| 6,305,438 B1 | 10/2001 | Sjoholm et al. | |
| 2012/0312415 A1* | 12/2012 | Gay | B65B 3/003 |
| | | | 141/2 |
| 2014/0060696 A1* | 3/2014 | Okuda | A61M 5/1782 |
| | | | 141/27 |

FOREIGN PATENT DOCUMENTS

| | | |
|---|---|---|
| JP | 2002-502781 | 1/2002 |
| JP | 2002-326607 | 11/2002 |
| JP | 2011-16577 | 1/2011 |
| JP | 6402960 | 10/2018 |
| JP | 2019-156466 | 9/2019 |
| JP | 3229870 | 12/2020 |
| KR | 10-2012-0131781 | 12/2012 |

OTHER PUBLICATIONS

Translation of the International Preliminary Report on Patentability issued Jan. 18, 2024 in International Application No. PCT/JP2022/021527.
Extended European Search Report issued Apr. 10, 2025 in corresponding European Patent Application No. 22837352.8.

* cited by examiner

DENTAL PASTE FILLING DEVICE AND METHOD

TECHNICAL FIELD

The present invention relates to a device that fills dental paste into a container, and more particularly, to a dental paste filling device and method suppressing entrainment of air bubbles and having high production efficiency.

BACKGROUND ART

There are various types of pastes as dental paste. These pastes are filled in various containers and used for treatment by dentists. When filling the paste, the air within the container or air existing in the paste flow passage may be mixed in the paste and may be captured or entrained as air bubbles into the paste. Entrainment of air bubbles into the paste brings about various problems from the viewpoint of physical properties and aesthetics, and from the viewpoint of hygiene.

For example, if the dental paste is an adhesive, the air bubbles reduce the adhesive effect. If the paste is a colorant, the air bubbles change color. Furthermore, if the air bubbles exist for a long time inside the dental paste, the paste may be deteriorated over time due to oxygen, etc. inside the air bubbles.

In another example, the dental paste is used as a restorative material to restore missing teeth. In this case, for example, the restoration is done by curing the paste after filling it in a tooth cavity inside the oral cavity, or by preparing a pre-cured element and mounting the pre-cured element on a tooth missing portion within the oral cavity. Additionally, there are pastes used as, a material to construct an abutment tooth for mounting a prosthesis thereon, a material to lute or adhere a prosthesis to an abutment tooth, a material to seal a tooth fissure, a material to coat a tooth surface, a material to fix a loose tooth with an adjacent tooth (including a prosthesis), etc.

In any case, since the dental paste is used for coating and curing, the coated surface or the cured element with air bubbles contained therein has an undesirable effect on physical properties and aesthetics.

For this reason, a technique has been desired that defoams the dental paste in the supply source and that after defoaming, prevents entrainment of air bubbles when filling the dental paste into a container.

PRIOR ART DOCUMENT

Patent Document

Patent Document 1: JP2011-016577A

Patent Document 1 describes a material filling device that rotates a material transfer unit by a rotational drive mechanism to apply centrifugal force toward the inner surface of a first container to push the material toward the inner surface in the first container. The device is configured such that the material is pushed against the inner surface by the centrifugal force, thereby moving the material toward through holes formed in the side wall, and transferring via the through holes to a plurality of second containers. In Patent Document 1, the production efficiency is poor because the rotational drive mechanism prevented a rapid replacing of a multiple containers. Patent Document 1 describes a pressure reduction means that reduces the pressure of a chamber including the first container and the second containers, to prevent entrainment of air bubbles. However, Patent Document 1 has no description of separately controlling defoaming in the first container and in the second containers. Moreover, since the first container supplying the material and the second containers receiving the material are provided altogether in a single large chamber, it is necessary to depressurize a large space resulting in a high power and long time for the depressurization.

SUMMARY OF THE INVENTION

Problem to be Solved by the Invention

Proposed is a device and a method efficiently filling dental paste into a container, while defoaming the dental paste before supply, and preventing entrainment of air bubbles when filling the dental paste into the container.

Means for Solving Problem

A dental paste filling device of a preferred embodiment is a dental paste filling device filling dental paste into a container without entraining air bubbles, comprising: a paste supply stage serving as a supply source of the dental paste; a paste filling stage where the dental paste is filled in the container; and a supply flow passage connecting the both stages, the paste supply stage comprising: a storage chamber for storing the dental paste; a storage chamber depressurizing and defoaming device for depressurizing the inside of the storage chamber to defoam the dental paste within the storage chamber; and a storage chamber extruding device for extruding the dental paste within the storage chamber towards the supply flow passage, the paste filling stage comprising: a filling chamber having an open/close mechanism; a holder for detachably holding the container inside the filling chamber; a filling chamber deaerating device for depressurizing the inside of the filling chamber to prevent entrainment of air bubbles into the dental paste; and a reception port for introducing the dental paste into the filling chamber, the supply flow passage comprising: an upstream tube connected to the storage chamber; a downstream tube connected to the reception port of the filling chamber, and a discharge control valve disposed between the upstream tube and the downstream tube, wherein the dental paste is defoamed in the paste supply stage and entrainment of air bubbles in the dental paste is prevented in the paste filling stage.

According to the preferred embodiment, the container is a syringe that includes: a cylinder to be filled with the dental paste; a nozzle disposed at a tip of the cylinder; and a plunger rod slidable up and down within the cylinder.

According to the preferred embodiment, the paste filling stage further includes a stop switch limiting a length of upward movement of the plunger rod.

According to the preferred embodiment, the discharge control valve is closed when the plunger rod moves upward and upon turning on of the stop switch.

According to the preferred embodiment, the holder comprises a holding arm detachably holding the container, and an arm drive mechanism for moving the holding arm to move up and down between a top position and a bottom position.

According to the preferred embodiment, the container is disconnected from the reception port when the holding arm is held at the top position, and the container is connected to the reception port when the holding arm is held at the bottom position.

According to the preferred embodiment, the upstream tube and the downstream tube are formed by a single tube having flexibility, and the discharge control valve is formed by a pinching member for pinching the single tube at a midway of the tube.

A dental paste filling method of a preferred embodiment is a dental paste filling method for filling dental paste in a container without entraining air bubbles, comprising the steps of: storing the dental paste in a storage chamber at a paste supply stage serving as a supply source of the dental paste; depressurizing the storage chamber to defoam the dental paste stored in the storage chamber; holding the container by a holder inside a filling chamber in a paste filling stage where the dental paste is filled in the container; depressurizing the filling chamber to prevent entrainment of air bubbles in the dental paste, while the filling chamber is air-tightly closed by an open/close mechanism of the filling chamber; holding the container at a reception port where the dental paste is introduced in the filling chamber; filling the dental paste in the container upon opening of a discharge control valve disposed on a supply flow passage connecting the paste supply stage and the paste filling stage; releasing depressurization of the filling chamber, upon closing of the discharge control valve after filling a predetermined amount of dental paste in the container; and removing the container from the holder upon opening of the open/close mechanism of the filling chamber, wherein the dental paste is defoamed in the paste supply stage and that entrainment of air bubbles in the dental paste is prevented in the paste filling stage.

MODES FOR CARRYING OUT THE INVENTION

Figure 1:
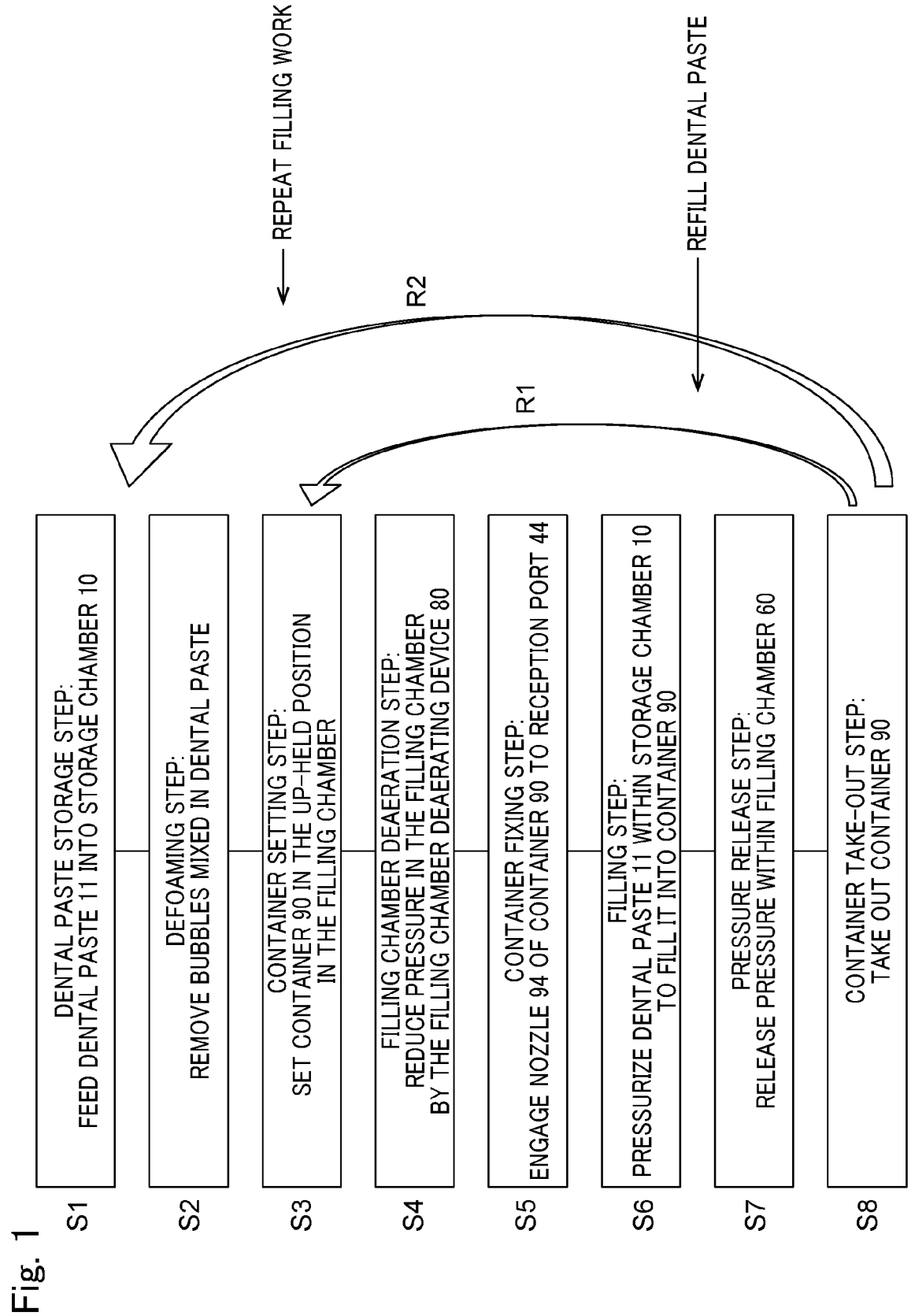
FIG. 1 is a flowchart showing steps of a dental paste filling method based on an embodiment.

An embodiment of a dental paste filling device and a method thereof according to the present invention will now be described with reference to the drawings. In the following embodiment, the same portions are designated by the same reference numerals and the description thereof will be omitted for the sake of brevity.

Dental paste as an object to be filled in a container is a composition containing resin and inorganic powder with some viscosity. Specifically, it is a dental composite resin, a dental abutment construction material, a dental resin cement, a dental coating material, a dental pit and fissure sealant, a dental manicure material, or a dental loose tooth fixing material. If the viscosity is low, air bubbles may come out naturally, but if the viscosity is high, removal form the container is difficult.

Figure 9:
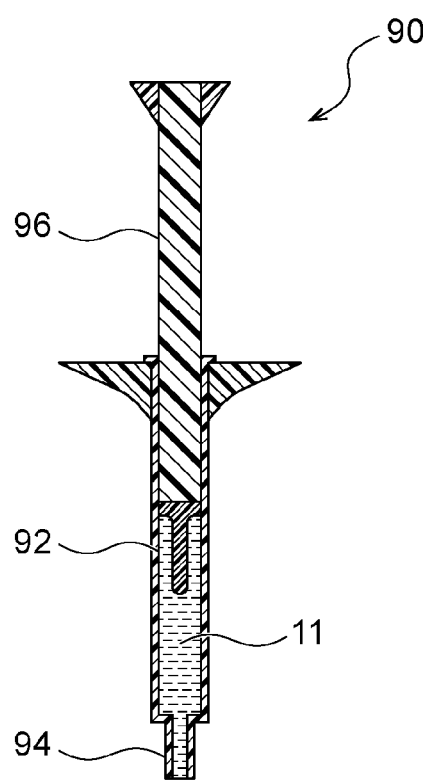
FIG. 9 is a cross-sectional view of a syringe.

The container to be filled is a container that is sold with dental paste filled therein, and is preferably a small container or a syringe container. It is preferable that a syringe container has a nozzle at the tip of a barrel and that the contents is pushed out with a push rod. An example of the syringe container is shown in FIG. 9.

Figure 2:
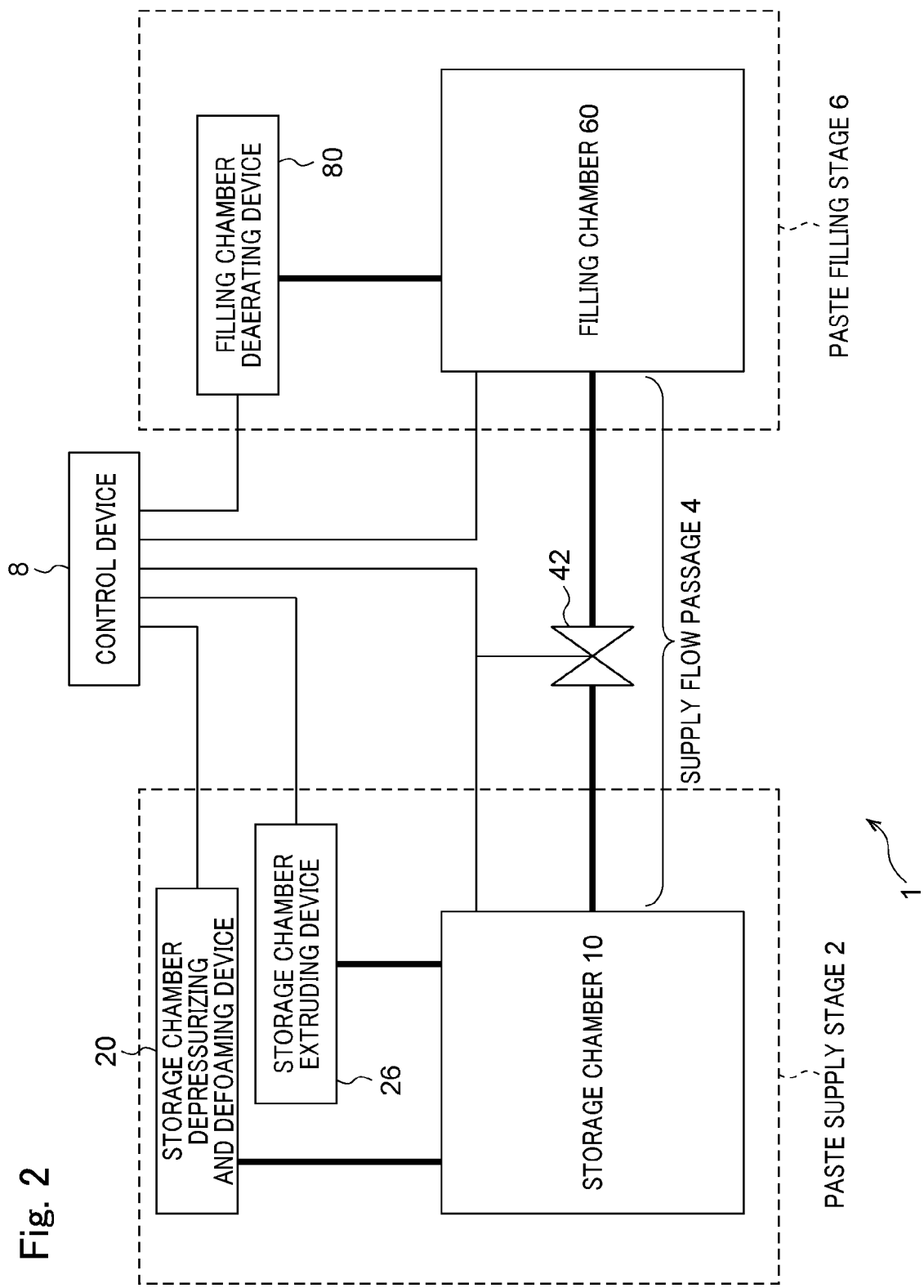
FIG. 2 is a block diagram showing a basic configuration of a dental paste filling device based on the embodiment.

FIG. 2 shows a basic configuration of a dental paste filling device. As shown in FIG. 2, a dental paste filling device 1 includes a paste supply stage 2, a paste filling stage 6, a supply flow passage 4, and a control device 8 that controls the entirety. The paste supply stage 2 serving as a dental paste supply source includes a storage chamber 10 (also called a tank), a storage chamber depressurizing and defoaming device 20 including a depressurizing pump, and a storage chamber extruding device 26 including a pressurizing pump. Instead of the pressurizing pump, a mechanical extruding device may be used as the storage chamber extruding device 26. In the paste supply stage 2, a defoaming process of eliminating air bubbles contained in dental paste is performed. The paste filling stage 6 includes a filling chamber 60 and a filling chamber deaerating device 80 including a depressurizing pump, and has a function of filling the container with dental paste delivered from the paste supply stage 2. In the paste filling stage 6, a process is performed for preventing entrainment of air bubbles during the filling process of filling a container with dental paste. The supply flow passage 4 includes a discharge control valve 42 and has a function to guide dental paste delivered from the paste supply stage 2 to the paste filling stage 6 at a controlled supply amount. The control device 8 generates various control signals, which are sent to the storage chamber depressurizing and defoaming device 20, the storage chamber extruding device 26, the storage chamber 10, the discharge control valve 42, the filling chamber 60, and the filling chamber deaerating device 80, to perform various controls.

Although as shown in FIG. 2, the paste supply stage 2 and the paste filling stage 6 are connected via the supply flow passage 4 having the discharge control valve 42, they are configured independently from each other particularly when the discharge control valve 42 is closed. It is therefore possible to independently control the defoaming process in the paste supply stage 2 and the process for preventing entrainment of air bubbles in the paste filling stage 6. That is, since the space to perform the defoaming process and the space to perform the process for preventing entrainment of air bubbles are separate spaces, the depressurization powers or the depressurization periods required for the processes in their respective spaces can be individually set to respective optimum values. The tank 10, i.e., the storage chamber can be replaced irrespectively of the filling chamber 60 as they are placed at different places.

FIGS. 3 to 9 show a preferred embodiment of the dental paste filling device.

Figure 3:
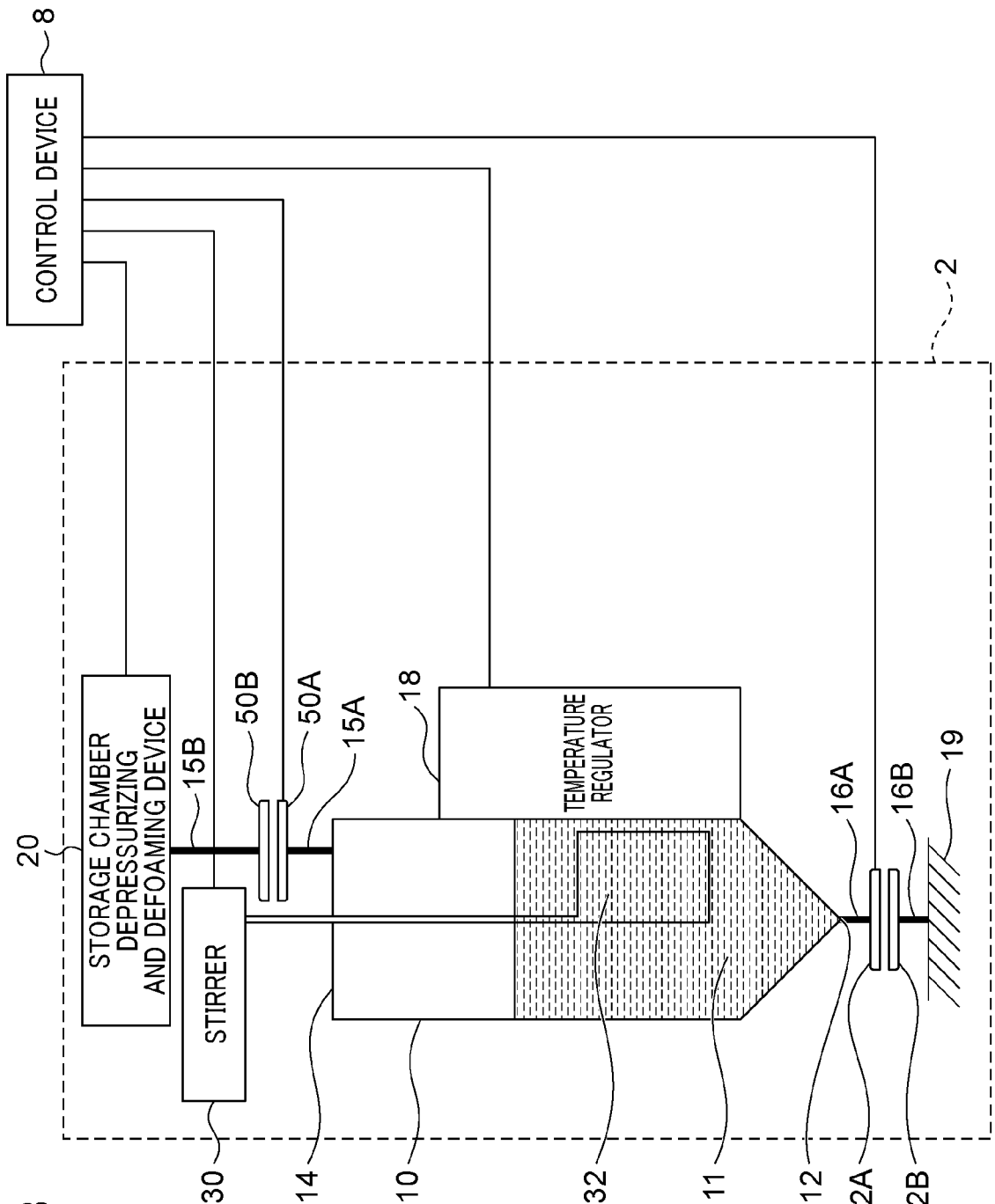
FIG. 3 is a block diagram of a paste supply stage based on the preferred embodiment.

FIG. 3 shows an example of the paste supply stage 2. The storage chamber 10 is formed of a cylindrical or syringe-shaped tank. The tank 10 has at its top a lid 14 that can be opened and closed. A tube 15A is connected to the lid 14, with a tube connector 50A being attached to a free end of the tube. A tube 15B is connected to the storage chamber depressurizing and defoaming device 20, with a tube connector 50B being attached to a free end of the tube 15B. The tube connectors 50A and 50B are detachably connected to each other. The tank 10 has a tapered bottom surface like a funnel, whose tip is formed with a discharge port 12. A tube 16A is connected to the discharge port 12, with a tube connector 52A being attached to a free end of the tube. A tube connector 52B is attached via a tube 16B to a fixed base 19. The tube 16B leads to a dead end at the fixed base 19. The tank 10 is supported by a support frame (not shown) formed on the fixed base 19. The tank 10 may be configured to perform rotation and/or revolution. The tube connectors 52A and 52B are detachably connected to each other. If the tube connectors 50A and 50B or 52A and 52B are connected, the passage of the tubes becomes conductive, whereas if disconnected, the passage to the tubes is cut off and the tube connectors themselves are cut off. The storage chamber depressurizing and defoaming device 20 is configured by the depressurizing pump.

The paste supply stage 2 further includes a temperature regulator 18 that regulates the temperature of the tank, and a stirrer 30 that can be fitted to the lid 14. The stirrer 30 has a stirring blade 32. When the stirring operation is finished, the stirrer 30 is withdrawn together with the stirring blade 32 from the lid 14.

In FIG. 3, the right part inside of the block enclosed by a dotted line of the paste supply stage 2 is left blank. It is noted that the storage chamber extruding device 26 and tube connectors 50C and 52C shown in FIG. 5 exist in this blank part, but they are omitted in FIG. 3 for the sake of brevity.

Depressurizing and defoaming operation by the storage chamber depressurizing and defoaming device 20 will be described. The lid 14 of the tank 10 is removed and resin and inorganic powder as the origin of the dental paste are fed into the tank. Resin and inorganic powder may be mixed together in advance. The lid 14 is then fitted with the stirrer 30 and closed to keep the storage chamber 10 within the tank air-tightly or hermetically sealed. Subsequently, the storage chamber depressurizing and defoaming device 20 operates to depressurize the inside of the storage chamber 10 in vacuum state. Though dental paste 11 fed to the inside of the storage chamber 10 is stirred by the stirring blade 32, no air bubbles are contained in the dental paste since the inside of the storage chamber 10 is in vacuum state. Even after depressurization, air bubbles may not be fully removed, but stirring helps the dental paste to be further purified with less air bubbles. That is, the dental paste 11 is stirred with the stirring blade 32 while depressurizing the inside of the storage chamber 10 storing the dental paste 11. Depressurization allows air bubbles captured in the dental paste to expand and increase in volume. The stirring blade 32 collapses expanded air bubbles and pushes out air inside air bubbles to the outside, consequently reducing air bubbles captured in the paste. This achieves defoaming work, i.e., eliminating air bubbles captured in the dental paste. The defoamed dental paste 11 accumulates around the discharge port 12 at the bottom due to its own weight.

In this embodiment, the temperature regulator 18 is disposed in the storage chamber 10 to control the temperature of the dental paste 11. It is preferred to lower the viscosity and increase the defoaming efficiency by heating the dental paste. Preferably, the dental paste is heated to 30 to 60 degrees centigrade to increase fluidity of the dental paste 11 to promote defoaming. The temperature regulator 18 is preferably a device warming the entire storage chamber 10, and specifically, has a jacket structure that allows hot water to flow on the outside of the storage chamber 10. As another example, it is also possible to cover the outside of the storage chamber 10 with a flexible rubber heater. Too low heating temperature may reduce the defoaming effect, whereas too high heating temperature may induce deterioration of the dental paste. Defoaming is performed to such a degree as to allow oral cavity use of the dental paste. When air bubbles captured in the dental paste come out and are defoamed, the defoaming process ends.

Figure 4:
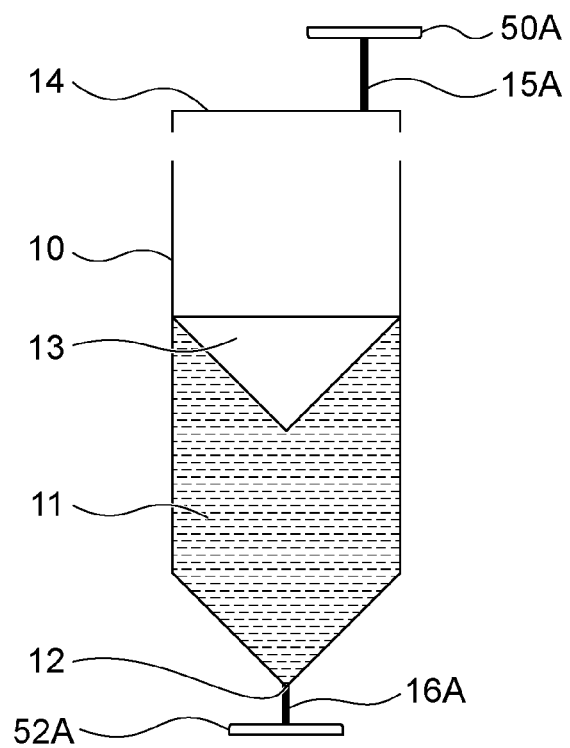
FIG. 4 is a schematic view of a storage chamber that is a tank.

When the dental paste in the storage chamber 10 is fully stirred and the stirrer 30 is removed, the tube connectors 50A and 52A are disconnected as shown in FIG. 4. The tube connector 52A is in a closed state so that the dental paste 11 cannot flow out from the tube connector 52A. The lid 14 is opened and a core (also called a floating core) is placed on the dental paste 11 in a floating state. A core 13 has a circular flat top surface and a tapered bottom surface which coincides with the tapered bottom surface of the storage chamber 10 in the form of the tank. The function of the core 13 is such that the core 13 slides down along the inner surface of the storage chamber 10 while pressing the dental paste 11 downward with a uniform pressure. When the dental paste 11 is almost empty, the tapered surface of the core 13 comes into contact with the tapered bottom surface of the storage chamber 10, resulting such that the dental paste can be pushed out to the very last drop.

Figure 5:
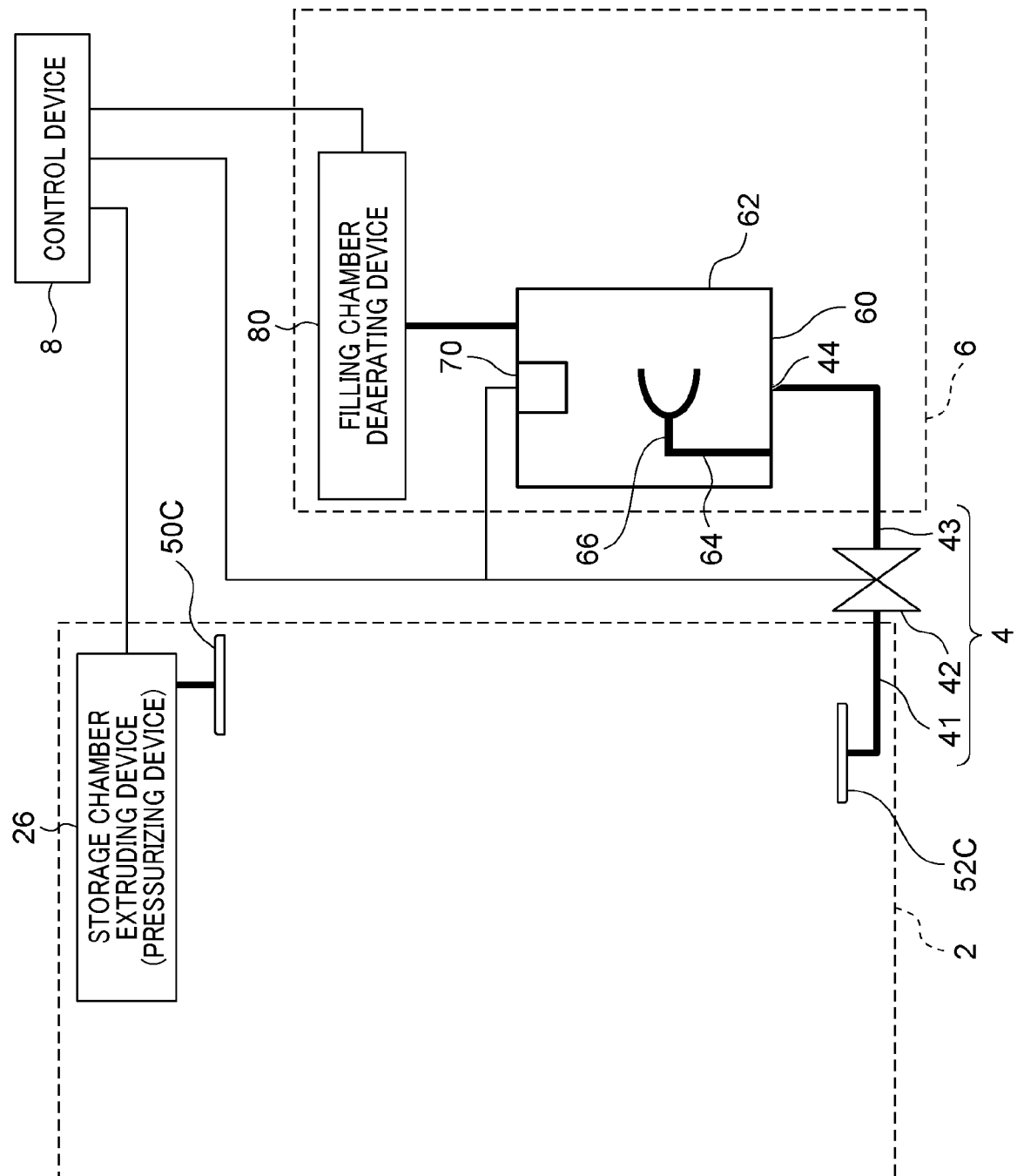
FIG. 5 is a block diagram of a part of the paste supply stage, and a paste filling stage, based on the preferred embodiment.

As shown in FIG. 4, after removing the stirrer 30, setting the core 13, and closing the lid 14, the tank 10 is arranged between the tube connectors 50C and 52C, as shown in FIG. 5. That is, the tube connectors 50A and 52A of the tank 10 are connected to the tube connectors 50C and 52C, respectively, shown in FIG. 5, and the tank 10 is fixed to the support frame (not shown).

In FIG. 5, the left part inside of the block enclosed by a dotted line of the paste supply stage 2 is left blank. It is noted that the storage chamber depressurizing and defoaming device 20, etc. shown in FIG. 3 exist in this blank part, but they are omitted for the sake of brevity. The same applies to FIGS. 6A to 6F.

In FIG. 5, the paste filling stage 6 includes the filling chamber 60 and the filling chamber deaerating device 80. The supply flow passage 4 has an upstream tube 41, the discharge control valve 42, and a downstream tube 43. The upstream tube 41 has an upstream end connected to the tube connector 52C and a downstream end connected to the discharge control valve 42. That is, the upstream end of the upstream tube 41 is connected via the tube connectors 52A and 52C to the discharge port 12 of the storage chamber 10. The downstream tube 43 has an upstream end connected to the discharge control valve 42 and a downstream end 44 connected directly to the filling chamber 60. The end 44 forms a reception port 44 to which a nozzle 94 (FIG. 9) of a syringe 90 described later is press-fitted or inserted.

The supply flow passage 4, particularly, the discharge control valve 42 will be described using FIGS. 7A to 7C.

Figure 7A:
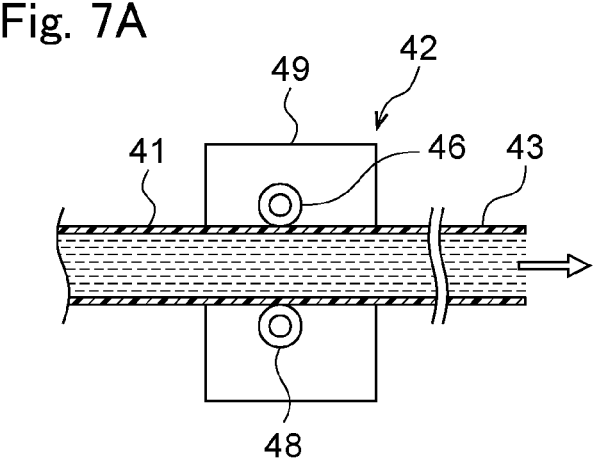
FIG. 7A is a schematic view of the embodiment of a discharge control valve.

As shown in FIG. 7A, the upstream tube 41 and the downstream tube 43 are formed by a single flexible tube, e.g., hose. The discharge control valve 42 and the tubes 41 and 43 can be of any known valves used for fluids in general industry. Considering the convenience, however, it is preferred to use a single hose or the like of a flexible material and to employ a valve that can control the discharge amount by pressing and releasing the hose or the like from outside. In this embodiment, the discharge control valve 42 is formed by a pair of rollers 46 and 48 and a drive device for driving the rollers. The rollers 46 and 48 are mounted on their respective shafts for free rotation. A shaft shift device 49, that is the drive device, is provided for shifting the roller shafts to perform an approach shift, a parallel shift, or a diagonal shift, which will be described below.

The shaft shift device 49 enables the pair of shafts to perform the approach shift (FIG. 7B) that is a movement toward and away from each other, and the parallel shift (FIG. 7C) shifting the pair of shafts, which are held in close proximity state, in a direction parallel to the axial direction of the tube. When the pair of rollers 46 and 48 are spaced apart from each other as shown in FIG. 7A, the discharge control valve 42 is in an open state. The discharge control valve 42 changes from the open state to a closed state, when the pair of shafts move towards each other in a direction of arrows shown in FIG. 7B (this movement is referred to as the approach shift moving the shafts in a direction perpendicular to the tube axial direction) resulting in the shafts to be in a pinched position. Furthermore, thereafter, the pair of shafts move in a direction of arrows shown in FIG. 7C (this movement is referred to as the parallel shift moving towards the upstream direction) generating a suck-in effect in the downstream side. In the pinched position, the tube is pressed from a round shape to a flat shape to stop the passage of the tube, to achieve the closed state. By the suck-in effect, the dental paste in the downstream side is slightly sucked into the tube, as shown on the right side of FIG. 7C.

Figure 7B:
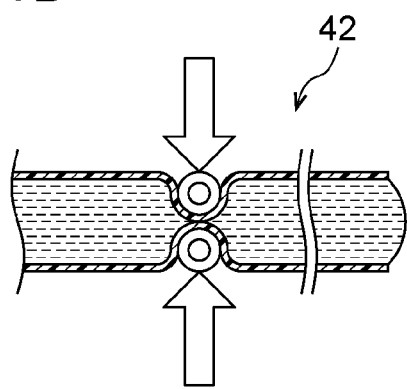
FIG. 7B is a view showing an operation of the discharge control valve.
Figure 7C:
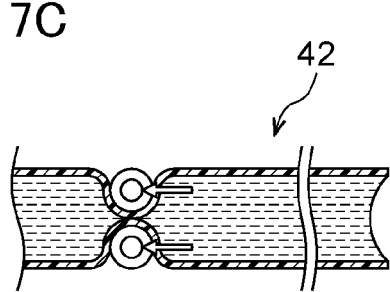
FIG. 7C is a view showing an operation of the discharge control valve.

When the parallel shift as shown in FIG. 7C, is given, the dental paste inside the tube is sucked in in the reverse flow direction. Thus, the dental paste existing in the downstream tube 43 is subjected to intake movement. That is, when the discharge control valve 42 changes from open to close state, the tube pressing direction is controlled to make the intake movement that induces the reverse flow of the dental paste in the downstream tube. As a result, when the filled-up syringe 90 is removed from the reception port 44, the dental paste around the reception port 44 is pulled into the downstream tube 43. This can prevent the dripping of the dental paste around the reception port 44.

It is possible for the pair of rollers to move slantingly (in a downstream diagonal direction) by combining the arrows of FIG. 7B and FIG. 7C, so that the rollers move from the upstream side of the tube toward the downstream side thereof. In this case, the shaft may take a downstream diagonal shift (shift crossing the tube axis slantingly from the upstream side to the downstream side). In this case, the tube is subjected to downstream diagonal pressing (pressing in a direction crossing the tube axis slantingly from the upstream side toward the downstream side).

As a modification of the discharge control valve 42, instead of using the pair of rollers 46 and 48, one roller may be replaced a fixed wall, with the other roller being a single roller confronting the fixed wall. In this case also, the roller shaft is provided with the shaft shift device 49 that does the approach shift and the parallel shift with respect to the wall. The shaft shift device 49 may do the downstream diagonal shift.

As another modification of the discharge control valve 42, instead of using the pair of rollers 46 and 48, one roller may be replaced with a fixed wall, with the other roller being a single rotary cam confronting the fixed wall. The cam is oval or non-circular. A shaft of the rotary cam does not shift, but transmits a rotational drive to the rotary cam. In this case, a shaft drive device is used as the drive device, not as the shaft shift device 49.

As described above, the discharge control valve 42 is formed by a pinching member that pinches the tube in a slanting direction toward the upstream side at a midway of the tube. That is, the pinching member has a function of approach pressing the tube (pressing the tube in the direction perpendicular to the tube axial direction) and of moving the pressed portion in the downstream direction, or the pinching member has a function of downstream diagonal pressing the tube (pressing the tube in the direction crossing the tube axis slantingly from the upstream side to the downstream side). The discharge control valve 42 is usually in the closed state but goes to the open state only for the period during which the dental paste is being filled in the syringe 90.

Referring now to FIG. 9, the syringe 90 will be described that is an example of the container 90 to be filled with the dental paste.

In FIG. 9, the syringe 90 includes a cylinder 92 to be filled with the dental paste 11, a nozzle 94 provided at the end of the cylinder 92, and a plunger rod 96 vertically and slidingly held within the cylinder 92. The syringe 90 is formed of a glass or a synthetic resin material. The syringe 90 is filled with the dental paste 11 and takes a filled state (FIG. 9) at which the plunger rod 96 is protruding, and an empty state (FIG. 6A) at which no dental paste is contained and the plunger rod 96 is inserted in the cylinder 92.

Returning to FIG. 5, the filling chamber 60 of the paste filling stage 6 has a structure that can be opened and closed, and in this embodiment, the filling chamber 60 has a door 62 as an example of an open/close mechanism. The filling chamber 60 becomes air-tight sealed when the door 62 is closed. A holder detachably holding the syringe 90 is disposed in the filling chamber 60. The holder has a holding arm 66 detachably holding the syringe 90, and an arm drive mechanism 64 causing the holding arm 66 to vertically move between an up position and a down position. When the holding arm 66 is at the up position, the nozzle 94 of the syringe 90 is separated from the reception port 44, and when the holding arm 66 is at the down position, the nozzle 94 of the syringe 90 engages with the reception port 44, so that they are press-fitted together or the nozzle 94 is inserted in the reception port 44, to couple the syringe 90 and the reception port 44 together. The holding arm 66 has a grip configuration allowing holding or grasping of the syringe 90. The holding arm 66 and the arm drive mechanism 64 have such a structure to maintain their function even when the filling chamber 60 is deaerated or vacuumed. For example, a structure expanding and contracting with air pressure is not included. The filling chamber 60 has at its ceiling a stop switch 70 that limits the upward movement distance of the plunger rod 96, as will be described below.

Figure 8:
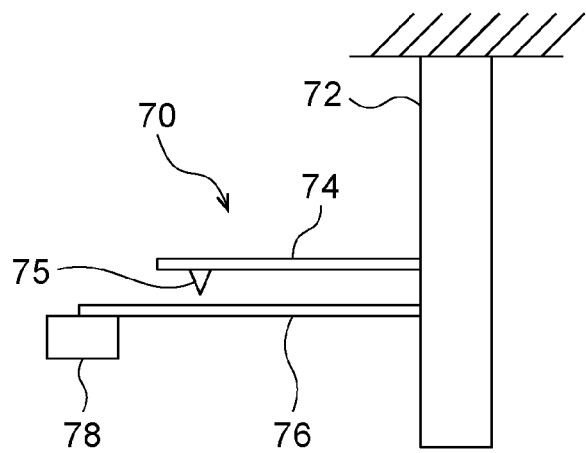
FIG. 8 is a schematic view of a stop switch.

As shown in FIG. 8, the stop switch 70 has a stem 72 extending downward from the ceiling wall of the filling chamber 60, an upper arm 74 extending transversely from the stem 72, a lower arm 76 extending transversely from the stem 72 under the upper arm 74, an electrically conductive contact terminal 75 disposed on the lower surface at the tip of the upper arm 74, and an abutting member 78 disposed on the lower surface of the tip of the lower arm 76. The lower arm 76 is made of a resilient material, e.g., a metal, and when bent upwardly, it comes into contact with the contact terminal 75, constituting an electrical switch. That is, when the lower arm 76 comes into contact with the contact terminal 75, an electrical circuit is established for switch on, whereas when the lower arm 76 separates from the contact terminal 75, switch off is achieved.

Referring to FIGS. 6A to 6F, operations of the paste filling stage 6 will be described. A series of operations are based on control signals from the control device 8.

Figure 6A:
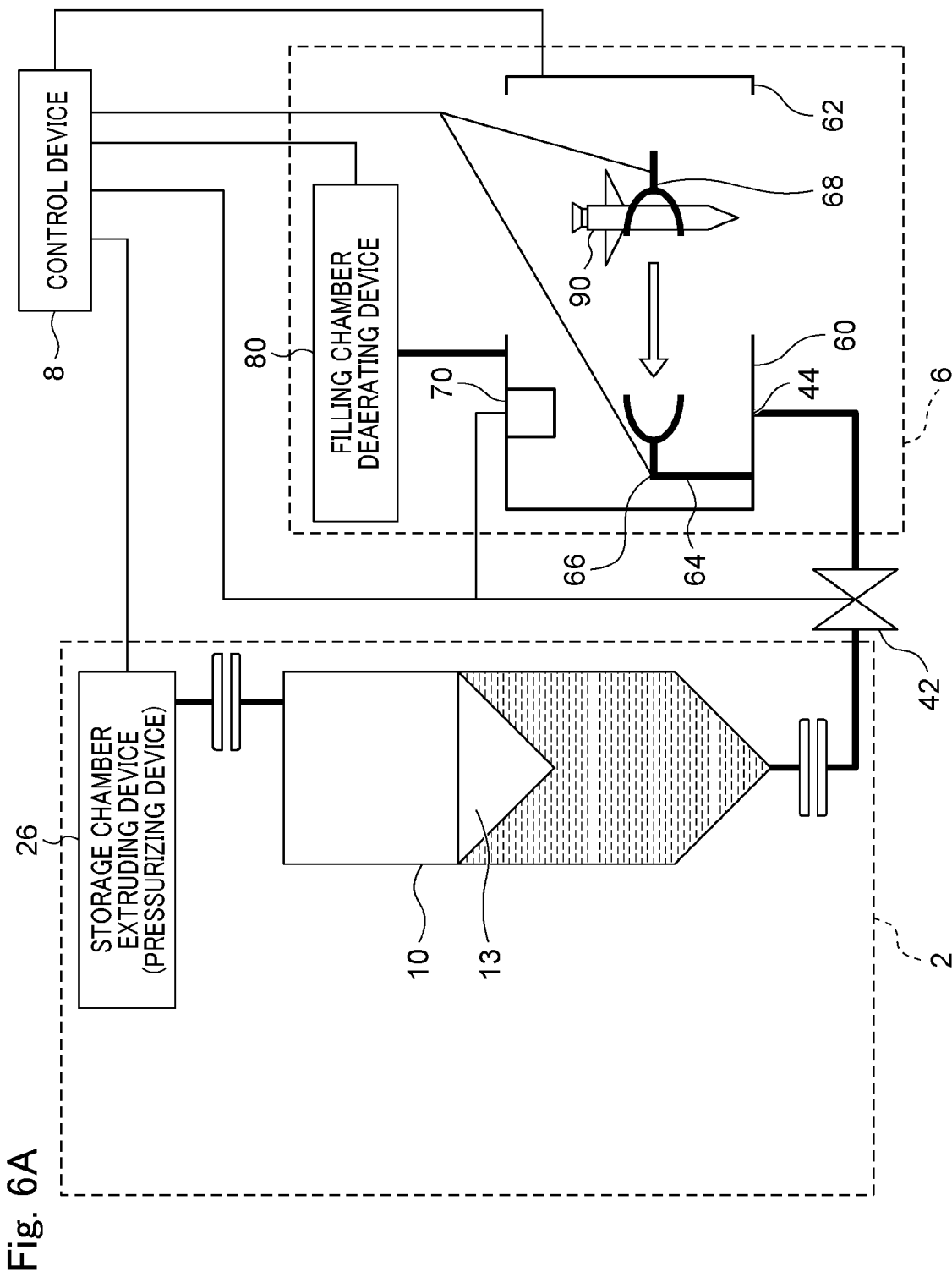
FIG. 6A is a block diagram of a part of the paste supply stage, and the paste filling stage.

As shown in FIG. 6A, the door 62 opens and an empty syringe 90 held by a transfer arm 68 is moved in the direction shown by an arrow, and is delivered to the holding arm 66. At this time, the holding arm 66 is at the up position. Also, the discharge control valve 42 is held in the closed state. Furthermore, the pressurizing pump at the storage chamber extruding device 26 within the paste supply stage 2 operates to pressurize the inside of the storage chamber 10. The storage chamber 10 needs to be pressurized only when the dental paste 11 is discharged from the storage chamber 10 into the filling chamber 60, and needs to be pressurized at the same time as or immediately before or after the container fixing step S3 that will be described later. In the case of controlling the flowrate of the dental paste 11 into the filling chamber 60, a flowmeter can be used. When a predetermined amount of dental paste 11 is filled from the nozzle 94 of the syringe 90 into the syringe 90, the plunger rod 96 abuts against the abutting member 78 that is an adjustment wall provided to prevent the plunger rod 96 from further protruding.

Figure 6B:
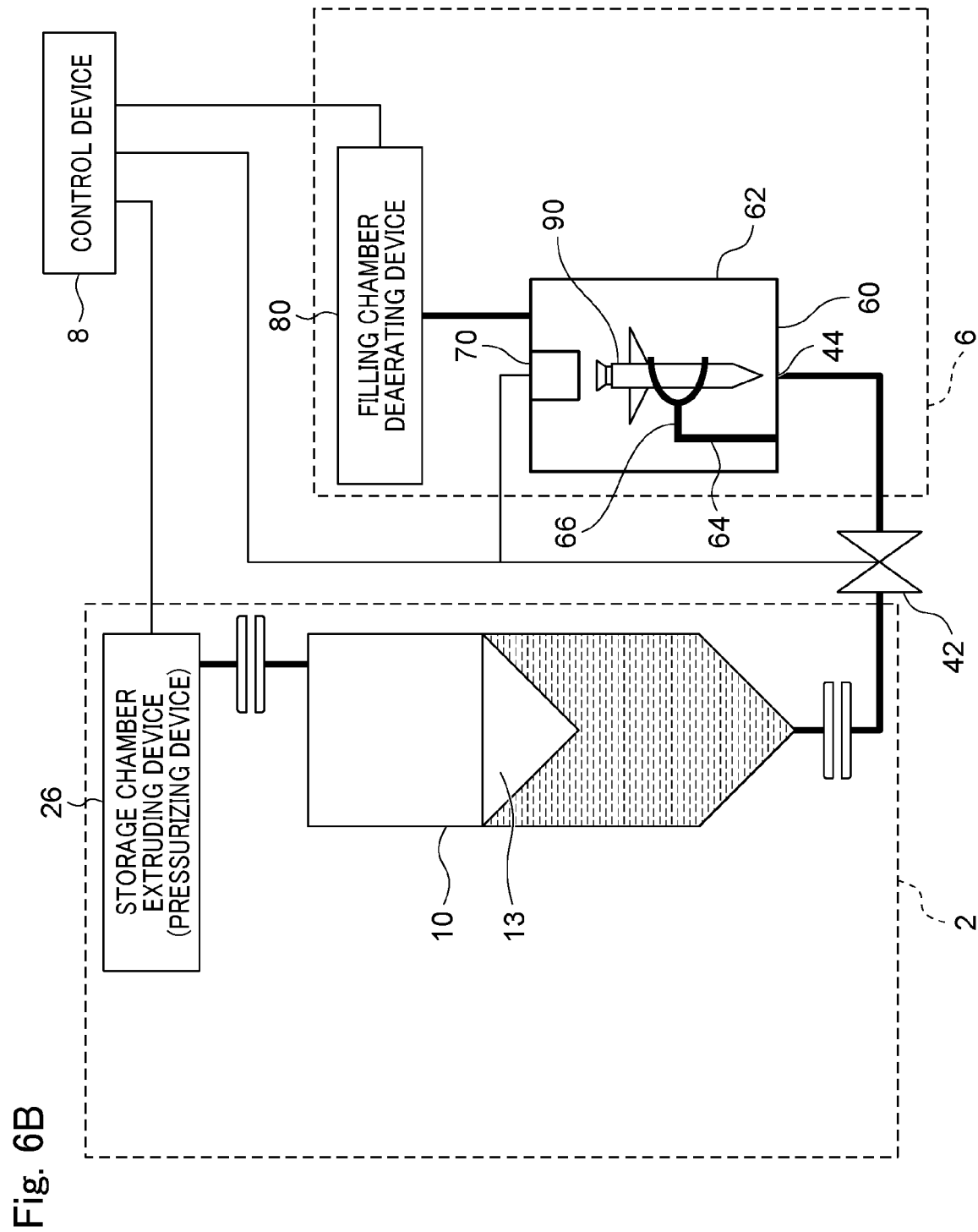
FIG. 6B is a block diagram of a part of the paste supply stage, and the paste filling stage.

As shown in FIG. 6B, the holding arm 66 holds the syringe 90 in the vertical direction. At this time, the axis of the syringe 90 coincides with the axis of the reception port 44 and the axis of the abutting member 78 (FIG. 8) of the stop switch 70. The nozzle 94 of the syringe 90 is spaced from the reception port 44, while the upper end of the plunger rod 96 is also spaced from the abutting member 78. That is, the syringe 90 is held in the air. In this state, the door 62 is closed and the filling chamber deaerating device 80 operates. The filling chamber deaerating device 80 is formed by the depressurizing pump to reduce the pressure inside the filling chamber 60 to create a vacuum state. The inside of the syringe 90, particularly, the inside of the nozzle 94 also brought to a vacuum state. It is to be noted that since the volume of the space of the filling chamber 60 is less than the volume of the space of the storage chamber 10, the depressurization power of the depressurizing pump of the filling chamber deaerating device 80 can be lower than the depressurization power of the depressurizing pump of the storage chamber depressurizing and defoaming device 20.

In this manner, the filling chamber 60 contains therein the syringe 90 that is a single container, and does not contain the storage chamber 10 that is a supply source of the dental paste 11. Thus, the filling chamber 60 needs to have a volume no more larger than to accommodate the single container 90, the holding arm 66 holding the container, and the arm drive mechanism 64. Hence, the depressurization power of the filling chamber deaerating device 80 needs to be much less than the depressurization power of the depressurizing means described in Patent Document 1. In addition, the time required for depressurization can be a very short time in the order of 1 second, resulting in efficient filling of the dental paste 11 into the syringe 90.

Figure 6C:
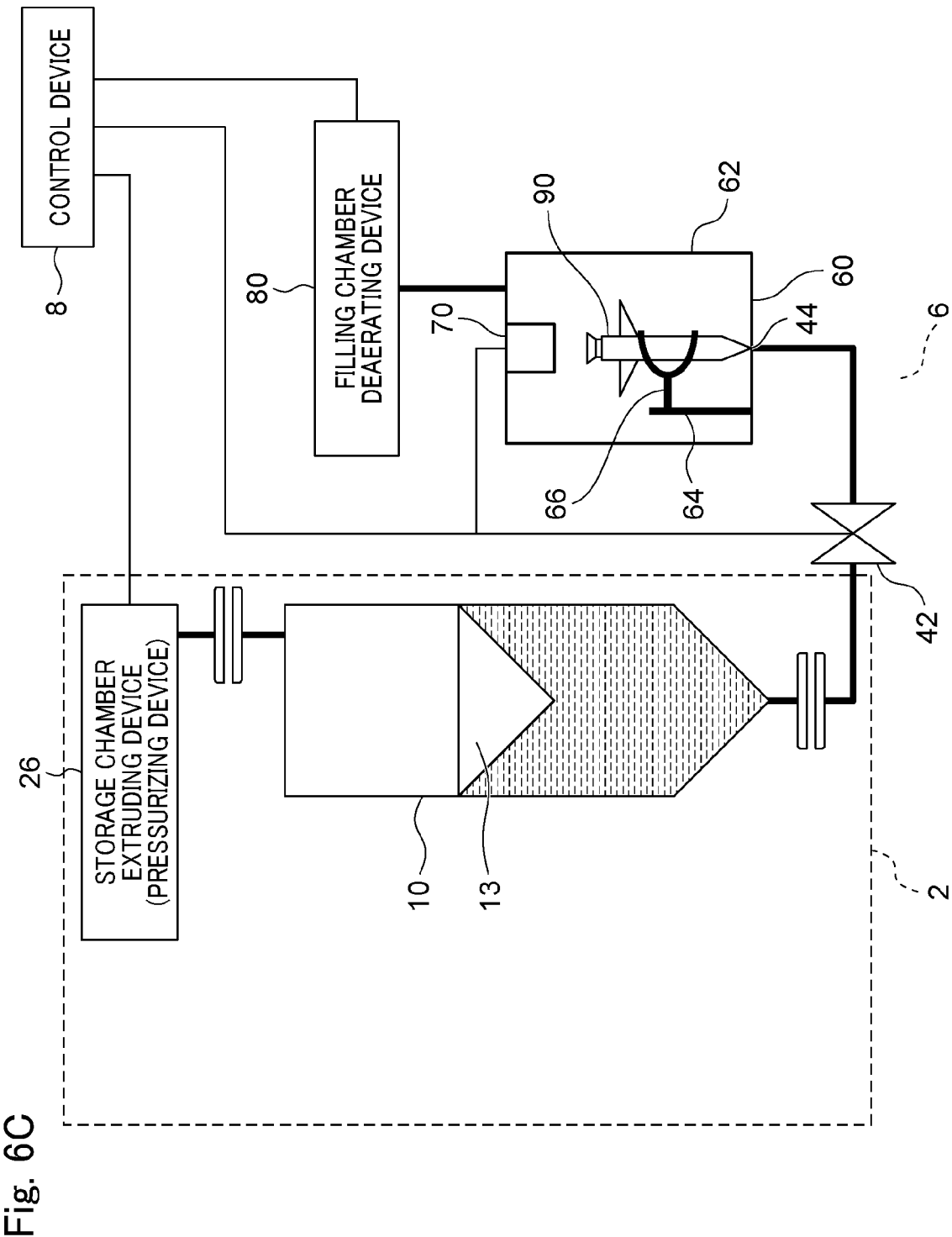
FIG. 6C is a block diagram of a part of the paste supply stage, and the paste filling stage.

Next, as shown in FIG. 6C, the holding arm 66 is moved to the down position by the arm drive mechanism 64 so that the nozzle 94 of the syringe 90 is pressed against or inserted into the reception port 44. The reception port 44 is made of a resilient material such as rubber, and the nozzle 94 is engaged to the reception port 44 in the inserted manner. The syringe 90 is held by the holding arm 66 with the nozzle 94 being pressed against or inserted into the reception port 44. In a certain embodiment, the inserted contact is ensured by pressing the tip of the nozzle 94 against the reception port 44, so that the dental paste 11 from the reception port 44 can be guided through the nozzle 94 into the syringe 90. In another embodiment, the reception port 44 has a threaded surface at its tip and the container nozzle 94 is also has a threaded surface so that the threaded surfaces can be screwed and fixed together. In this case, the holding arm 66 has a rotation function.

Figure 6D:
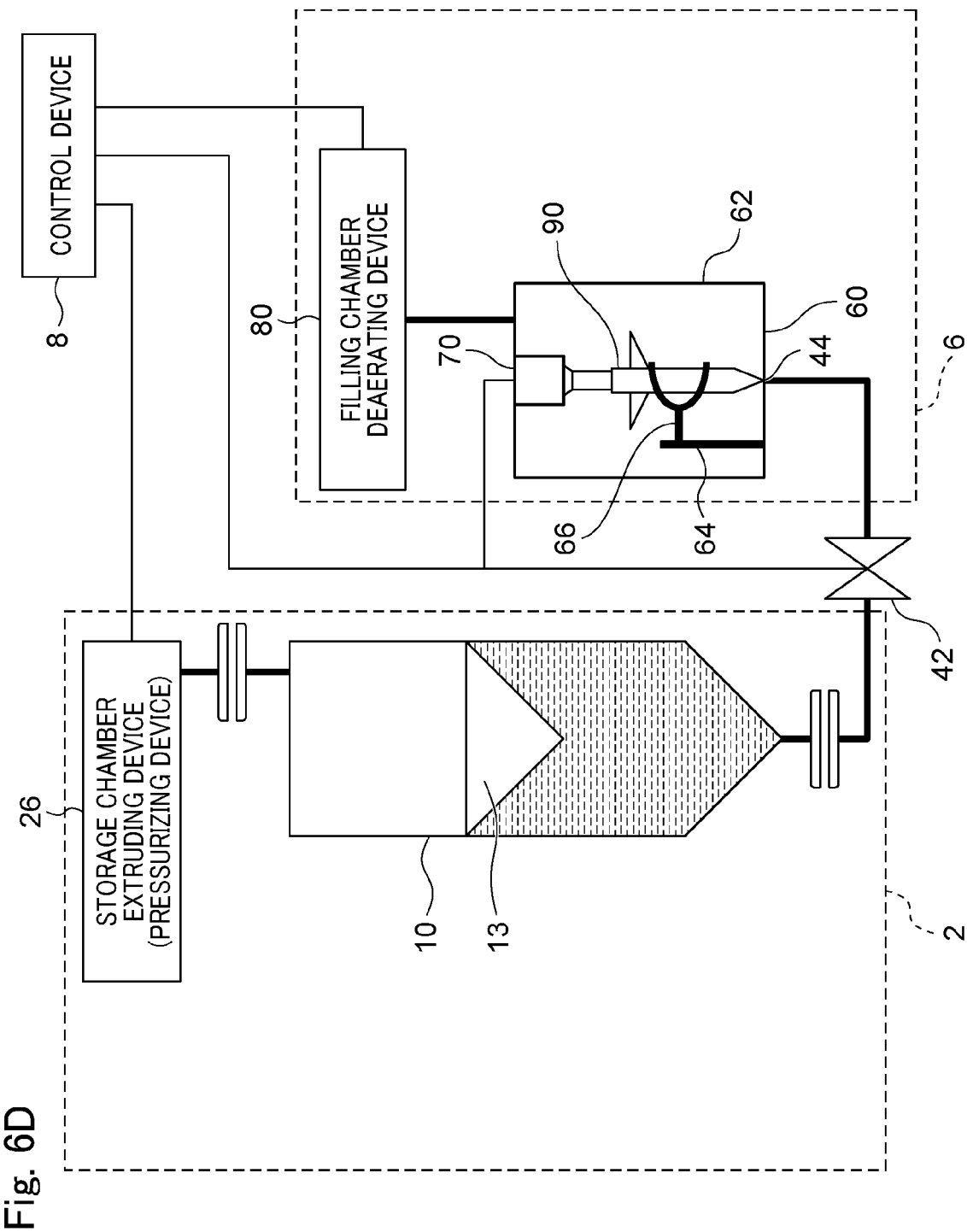
FIG. 6D is a block diagram of a part of the paste supply stage, and the paste filling stage.

Next, as shown in FIG. 6D, the discharge control valve 42 is changed from the close state to the open state by a signal from the control device 8. Instead of using the control device 8, a manually operated start button may be provided and pushed for obtaining the open state. As a result, the dental paste within the storage chamber 10 is extruded by the pressure, and injected through the supply flow passage 4 and the reception port 44 into the nozzle 94. Since the inside of the nozzle 94 is also in vacuum state, air bubbles will not be produced. Consequently, the dental paste 11 is filled in the syringe 90, and the plunger rod 96 protrudes upwardly. When the top surface of the plunger rod 96 abuts against the abutting member 78 of the stop switch 70, the switch is turned on. When the switch is turned on, the ON signal is transmitted via the control device 8 to the discharge control valve 42 to close the discharge control valve 42. At this time, the discharge control valve 42 closes accompanying the intake movement. This intake movement allows the dental paste at the reception port 44 to be pulled into the tube.

Figure 6E:
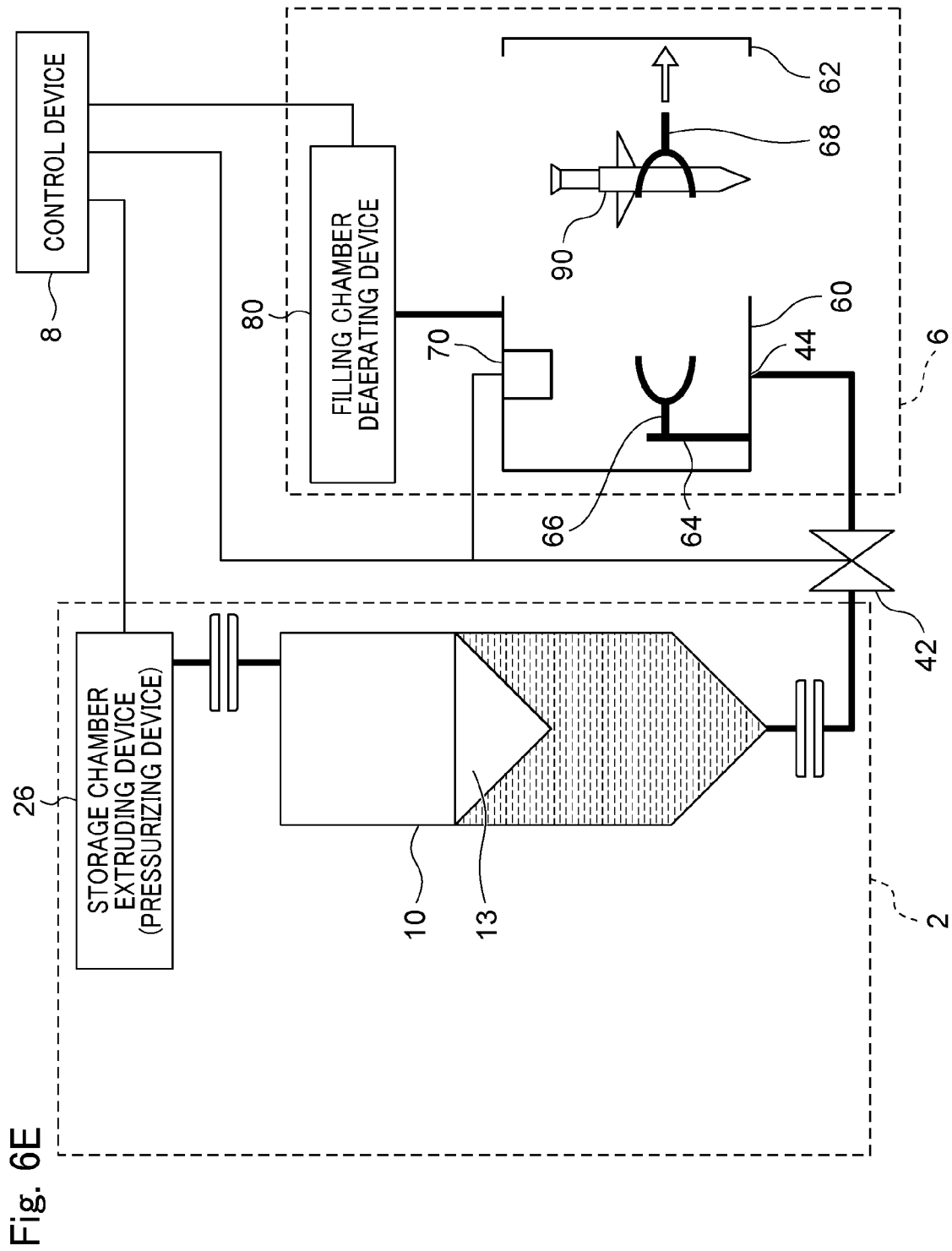
FIG. 6E is a block diagram of a part of the paste supply stage, and the paste filling stage.

Next, as shown in FIG. 6E, the door 62 opens and the filled syringe 90 is taken out from the filling chamber 60 by the transfer arm 68. At this time, the nozzle 94 of the syringe 90 is separated from the reception port 44, the dental paste at the reception port 44 is pulled into the tube by the intake movement so that no dental paste liquid seeps out from the reception port 44. Thus, the reception port 44 can be kept clean at all times.

Figure 6F:
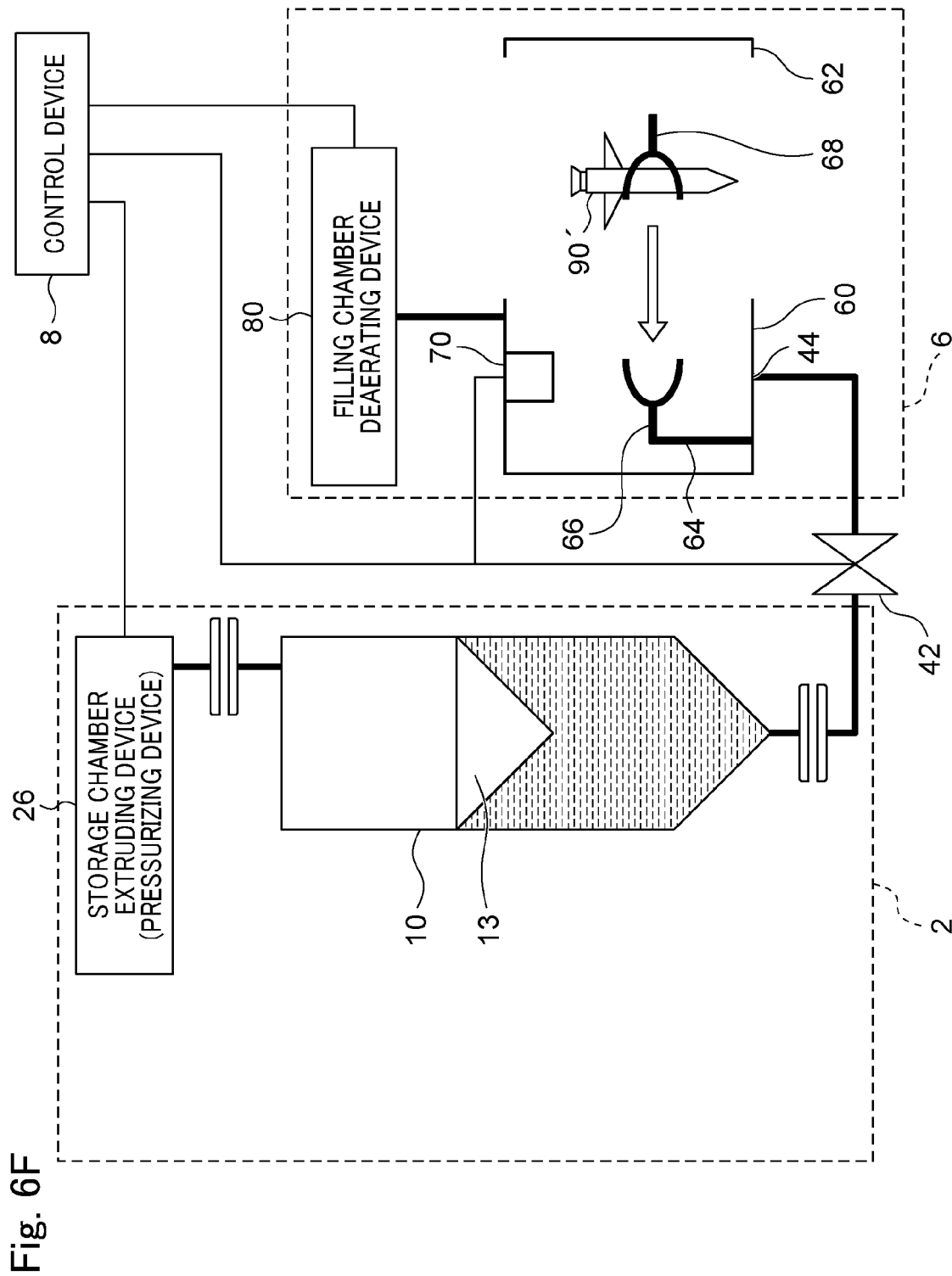
FIG. 6F is a block diagram of a part of the paste supply stage, and the paste filling stage.

Next, as shown in FIG. 6F, a new empty syringe 90' held by the transfer arm 68 is moved in the direction shown by an arrow and delivered to the holding arm 66. At this time, the holding arm 66 is already returned from the down position to the up position by the arm drive mechanism 64. The timing to return the holding arm 66 from the down position to the up position may be immediately before the filled syringe 90 is taken out of the filling chamber 60 by the transfer arm 68.

The operation thereafter is repeated from FIG. 6A.

The operation of delivering the syringe 90 to the holding arm 66 and the operation of receiving the syringe 90 from the holding arm 66 may be performed manually without using the transfer arm 68.

Although the door 62 as an example of the open/close mechanism is shown as a front open door in this embodiment, it may be a top open door. The open/close mechanism may be such that the filling chamber 60 can be made of a domed or cylindrical cover having one end closed and the other end opened. The cover can move up and down so that the cover can be brought in to air-tight contact with the floor surface made of a resilient material.

Since the above embodiment can provide the dental paste filling device configured to defoam the dental paste in the paste supply stage and prevent capturing of air bubbles in the paste filling stage 6, it is possible to individually adjust the depressurizing time and depressurizing pressure required for defoaming and the depressurizing time and depressurizing pressure necessary to prevent the capturing of air bubbles, achieving the respective optimum adjustments.

Figure 10:
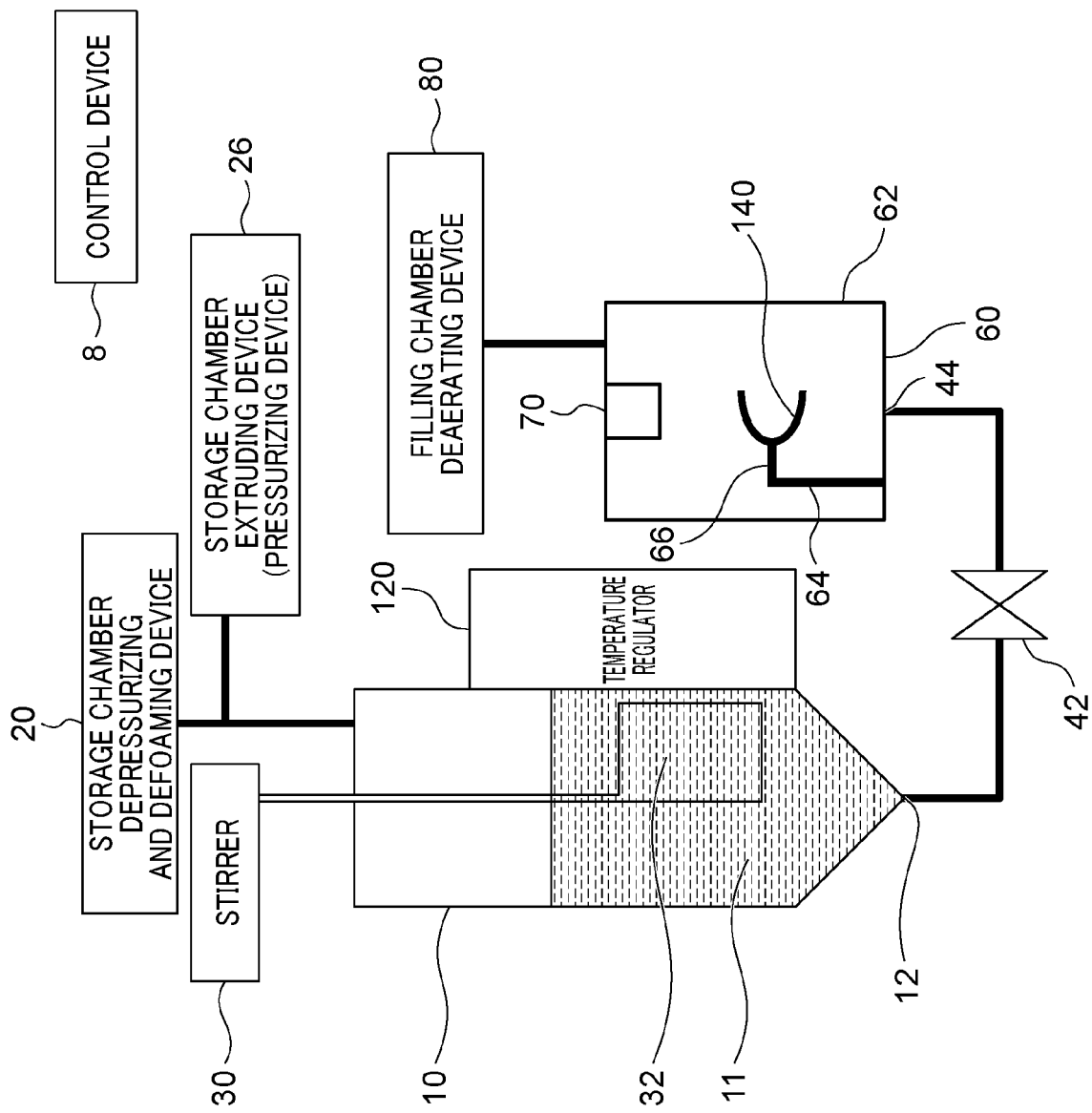
FIG. 10 is a block diagram of a dental paste filling device based on a second embodiment.

FIG. 10 shows a second embodiment of the dental paste filling device.

In the second embodiment shown in FIG. 10, the storage chamber 10 and the filling chamber 60 are always connected to each other via the supply flow passage 4. The tube connectors between the storage chamber 10 and the filling chamber 60 are therefore not necessary. The other configurations are the same as those of the first embodiment. In the second embodiment, when the dental paste within the storage chamber 10 runs out, the dental paste or raw materials are directly supplied to the storage chamber 10. This eliminates the need to remove/mount the storage chamber 10 from/on the fixed base 19.

FIG. 1 is a flowchart showing steps of a dental paste filling method.

Although the dental paste filling method is not limited to the order of steps shown in the process flowchart, it is preferred to go through the steps in the order of this process flowchart.

First step S1 is a "dental paste storage step" at which the dental paste 11 is fed to the storage chamber 10. At step S1, the dental paste 11 is preliminarily kneaded into paste state and then fed. As another method, a powder material and a liquid material as raw materials may be fed and kneaded in storage chamber 10 at step S1. It is possible to prepare the mixture in the pre-stage paste without defoaming, but preferably, the mixture should be mixed to be in the paste condition before storing in the storage chamber 10.

Next step S2 is a "defoaming step", which is a step for defoaming the dental paste within the storage chamber 10. In step S2 air bubbles are removed inside the paste, i.e., defoamed. The state (density) of air bubbles inside the paste is preferably made at the same level as the state (density) of air bubbles seen when filled in the container. When feeding the powder and liquid material, it is important to make an approximately uniformly dispersed paste. In the case of feeding preliminarily kneaded paste, air bubbles mixed upon feeding need only be roughly removed. Defoaming is preferably carried out by depressurization and stirring. A depressurizing device for use in depressurization is preferably implemented by a normal depressurizing pump or defoaming pump.

Next step S3 is a "container setting step" which is a step for setting the container 90 to be filled with dental paste in the filling chamber 60. Any method for setting the container may be used, such as the one utilized in the general industry. In a preferred embodiment, a method which uses an arm-like holding unit in the filling chamber is taken. In this case, the method preferably uses a jig which is concaved depending on the shape of the container, particularly the outer shape of the container, to capture the container therein.

Next step S4 is a "filling chamber deaeration step" which is a step for reducing the pressure inside the filling chamber 60 using the filling chamber deaerating device 80. At step S4, the air inside the filling chamber 60 is removed to control the entrainment of air bubbles in the paste. It is important to remove air before the container 90 is filled. The filling chamber 60 is preferably air-tightly or hermetically closed to remove internal air. The air removal level is at such a level as not to entrain air bubbles when filling the past. Preferably, the filling chamber deaerating device 80 is implemented by a normal depressurizing pump or defoaming pump.

Next step S5 is a "container fixing step" which is a step for fixing or engaging the nozzle 94 of the container 90 to the reception port 44. At step S5, it is preferable to fix the container to the reception port 44 such that the container receives paste discharged from the supply flow passage. For example, in the case of a container such as a syringe, preferably, fixing is performed so that direct connection is achieved between the reception port 44 and the nozzle 94 so as to guide the dental paste discharged from the reception port in the container without having any leakage or air entrainment during filling. The fixing may be performed such that the reception port 44 and the nozzle 94 are screwed together thereby guiding the dental paste discharged from the reception port in the container. From the viewpoint of efficiency, it is preferred have a simple and easy connection such as the pressing connection in which the reception port 44 and the nozzle 94 are pressed against each other to guide the dental paste discharged from the reception port to the container.

Next step S6 is a "filling step" which is a step for filling the container 90 with the dental paste 11. At step S6, the storage chamber 10 is pressurized with the discharge control valve 42 being opened, to allow the paste to flow from the storage chamber 10 to the filling chamber 60 to fill the container 90. The storage chamber 10 may be pressurized with a mechanical force via the core 13 within the storage chamber 10. The storage chamber 10 may be a hermetically closed container so that it can be pressurized by injecting gas such as air. In the case of pressurizing with air or the like, the discharge port 12 is preferably formed at a location where the paste accumulates due to its own weight. The amount of the paste 11 filled in the container 90 can be controlled by the flowrate, the open/close time of the discharge control valve 42, etc. When the container is the syringe, the paste filling amount can be controlled by the length of movement of the plunger rod 96.

Next step S7 is a "pressurization release step" which is a step for reducing the pressure within the filling chamber 60. At step S7, after a predetermined amount of paste is filled in the container 90, the pressurization within the filling chamber 60 is released. In a certain embodiment, the discharge control valve 42 is closed after the storage chamber 10 is also returned to normal pressure.

Next step S8 is a "container take-out step" which is a step for taking the container 90 out of the filling chamber 60. At step S8, the container 90 is taken out of the depressurized filling chamber 60. Since the filling chamber 60 is already returned to the normal pressure at the pressurization release step S7, the container can be taken out therefrom. Since the filling chamber 60 was in hermetically closed state, the hermetically closed state is released for taking out the container 90.

In FIG. 1, an arrow R1 indicates a case where the procedure returns to step S3 after step S8, to repeat the filling operation using a new empty container 90. An arrow R2 indicates a case where the procedure returns to step S1 after step S8, to refill the storage chamber 10 with dental paste.

INDUSTRIAL APPLICABILITY

The present disclosure can be used for industrial utilization relating to a technique for filling a container with dental paste.

EXPLANATIONS OF LETTERS OR NUMERALS 1 dental paste filling device
2 paste supply stage
4 supply flow passage
6 paste filling stage 8 control device
10 storage chamber
11 dental paste
12 discharge port
13 core
14 lid
15A, 15B, 16A, 16B tube
18 temperature regulator
19 fixed base
20 storage chamber depressurizing and defoaming device
26 storage chamber extruding device
30 stirrer
32 stirring blade
41 upstream tube
42 discharge control valve
43 downstream tube
44 reception port
46, 48 roller
49 shaft shift device
50A, 50B, 50C, 52A, 52B, 52C tube connector
60 filling chamber
62 door
64 arm drive mechanism
66 holding arm
70 stop switch
72 stem
74 upper arm
75 contact terminal
76 lower arm
78 abutting member
80 filling chamber deaerating device
90 syringe
92 cylinder
94 nozzle
96 plunger rod

The invention claimed is:

1. A dental paste filling device for filling dental paste in a container without entraining air bubbles, comprising:
    a paste supply stage serving as a supply source of the dental paste;
    a paste filling stage where the dental paste is filled in the container; and
    a supply flow passage connecting both of the stages,
    wherein the paste supply stage comprises:
        a storage chamber for storing the dental paste;
        a storage chamber depressurizing and defoaming device for depressurizing an inside of the storage chamber to defoam the dental paste within the storage chamber; and
        a storage chamber extruding device for extruding the dental paste within the storage chamber towards the supply flow passage,
    wherein the paste filling stage comprises:
        a filling chamber having an open/close mechanism;
        a holder for detachably holding the container inside the filling chamber;
        a filling chamber deaerating device for depressurizing an inside of the filling chamber to prevent entrainment of air bubbles into the dental paste; and
        a reception port for introducing the dental paste into the filling chamber,
    wherein the supply flow passage comprises:
        an upstream tube connected to the storage chamber;
        a downstream tube connected to the reception port of the filling chamber; and
        a discharge control valve disposed between the upstream tube and the downstream tube,
    wherein the holder comprises:
        a holding arm configured to detachably hold the container; and
        an arm drive mechanism for moving the holding arm move up and down between a top position and a bottom position,
    wherein the container is disconnected from the reception port when the holding arm is held at the top position, and the container is connected to the reception port when the holding arm is held at the bottom position, and
    wherein the dental paste is defoamed in the paste supply stage and entrainment of air bubbles in the dental paste is prevented in the paste filling stage.

2. The dental paste filling device of claim 1, wherein
    the upstream tube and the downstream tube are formed by a single tube having flexibility, and wherein
    the discharge control valve is formed by a pinching member for pinching the single tube at a midway of the tube.

3. The dental paste filling device of claim 2, wherein
    when the discharge control valve shifts from open to closed, a tube pressing direction of the pinching member is controlled to produce an intake movement that induces a reverse flow of the dental paste in the downstream tube towards the upstream tube.

4. The dental paste filling device of claim 1, wherein
    the container is a syringe that includes:
        a cylinder to be filled with the dental paste;
        a nozzle disposed at a tip of the cylinder; and
        a plunger rod slidable up and down within the cylinder.

5. The dental paste filling device of claim 4, wherein
    the paste filling stage further comprises a stop switch limiting a length of upward movement of the plunger rod.

6. The dental paste filling device of claim 5, wherein
    the discharge control valve is closed when the plunger rod moves upward and upon turning on of the stop switch.

7. A dental paste filling method for filling dental paste in a container without entraining air bubbles, the method comprising:
    storing the dental paste in a storage chamber at a paste supply stage serving as a supply source of the dental paste;
    depressurizing the storage chamber to defoam the dental paste stored in the storage chamber;
    holding the container by a holder inside a filling chamber in a paste filling stage where the dental paste is filled in the container, wherein the container has a cylinder and a nozzle at an end of the cylinder;
    depressurizing the filling chamber to prevent entrainment of air bubbles in the dental paste, while the filling chamber is air-tightly closed by an open/close mechanism of the filling chamber;
    engaging the nozzle of the container at a reception port where the dental paste is introduced in the filling chamber;
    filling the dental paste in the container from the nozzle upon opening of a discharge control valve disposed on a supply flow passage connecting the paste supply stage and the paste filling stage, wherein the discharge control valve guides the dental paste from the paste supply stage to the paste filling stage;
    releasing depressurization of the filling chamber, upon closing of the discharge control valve after filling a predetermined amount of dental paste in the container; and removing the container from the holder upon opening of the open/close mechanism of the filling chamber,
wherein the dental paste is defoamed in the paste supply stage and entrainment of air bubbles in the dental paste is prevented in the paste filling stage.

\* \* \* \* \*